United States Patent
Raghupathy et al.

(10) Patent No.: US 8,490,114 B1
(45) Date of Patent: Jul. 16, 2013

(54) METHOD AND APPARATUS FOR ACCESSING RICH INTERNET CONTENT

(75) Inventors: Ramprakash Raghupathy, Chennai (IN); Srikumar Sankaran, Karnataka (JP)

(73) Assignee: Adobe Systems Incorporated, San Jose, CA (US)

( * ) Notice: Subject to any disclaimer, the term of this patent is extended or adjusted under 35 U.S.C. 154(b) by 321 days.

(21) Appl. No.: 12/802,843

(22) Filed: Jun. 15, 2010

(51) Int. Cl.
*G06F 3/00* (2006.01)

(52) U.S. Cl.
USPC ............................................. 719/318

(58) Field of Classification Search
USPC ............................................. 719/318
See application file for complete search history.

(56) References Cited

U.S. PATENT DOCUMENTS

| | | | | |
|---|---|---|---|---|
| 7,260,307 B2 * | 8/2007 | Lin et al. | ........................ | 386/230 |
| 8,230,039 B2 * | 7/2012 | Corbett | ........................ | 709/217 |
| 2008/0077476 A1 * | 3/2008 | McElhiney et al. | ............. | 705/10 |
| 2009/0265367 A1 * | 10/2009 | Corbett | .......................... | 707/102 |
| 2009/0327261 A1 * | 12/2009 | Hawkins | ............................ | 707/5 |
| 2010/0214607 A1 * | 8/2010 | Hepworth et al. | ........... | 358/1.15 |
| 2011/0093588 A1 * | 4/2011 | Karayi et al. | ................. | 709/224 |

OTHER PUBLICATIONS

Giovanni, Modeling Distributed Events in Data-Intensive Rich Internet Applications, 2007.*

* cited by examiner

*Primary Examiner* — Lechi Truong
(74) *Attorney, Agent, or Firm* — Moser Taboada

(57) ABSTRACT

A method and apparatus for accessing rich Internet content is disclosed. In one embodiment, a computer implemented method selects an event within a rich Internet application (RIA) and determines if execution of the event requires at least one non-deterministic parameter value. If execution of the event requires at least one non-deterministic parameter value, the method sets the at least one non-deterministic parameter value to a predetermined parameter value and executes the event using the predetermined parameter value to access rich Internet content associated with the event.

16 Claims, 6 Drawing Sheets

METHOD AND APPARATUS FOR ACCESSING RICH INTERNET CONTENT

BACKGROUND

1. Field

Embodiments described herein generally relate to techniques for accessing web content and, more specifically, to accessing rich Internet content to support content related processes such as indexing of rich internet content.

2. Description of the Related Art

Rich Internet Applications (RIAs) provide interactive functionality for multimedia content, e.g., user interactive controls and application generated controls that creates an exciting and interesting multimedia experience. Consequently, RIAs have become a very popular multimedia presentation tool on websites throughout the Internet.

An RIA typically is a collection of content that is wrapped within programming code to be executed by a playback routine. For example, some RIAs may comprise animations, interfaces, games, video clips, audio clips, and/or other interactive or passive content (referred to herein as "rich Internet content"). In addition, the RIA typically includes program code to instruct a playback routine (referred to as an "RIA Player") how to display and progress through the content of the RIA. One such RIA Player is a FLASH® player (FLASH is a registered trademark of Adobe Systems Incorporated) that executes an RIA in the form of a SWF file to present rich Internet content to a viewer. Another type of RIA player includes the open-source Gnash software. Other varieties of RIA players include frame-based players and their associated RIAs.

To broadly utilize the content within an RIA, the content needs to be accessible to content related processes such as, for example, content searching and indexing. However, searching and indexing an RIA has been a challenge for the various search engines particularly because of multiple layers of interactive functionality contained in the RIA. According to a conventional technique, search engine crawlers (or other indexing agents) are configured to execute an RIA, triggering various interactive or other functionalities. As the crawler executes the RIA, each functionality event is triggered and the crawler captures the text within a resulting "page", frame or other textual output to produce an index representing the content presented by the RIA. At various points during the RIA execution, a function may have alternative branches that either automatically branch or branch in response to user input (e.g., help button, game selection, and the like). The crawler exercises one branch, then returns (retraces) to the branch point and exercises the alternate branch; all the while, capturing the textual information produced by the RIA.

In some instances, a branch point or a point along the branch executes a call function that retrieves information from outside of the RIA, e.g., current time, current location or position, a random number, and the like. The RIA may use this information to determine the content to be displayed. When the crawler returns (retraces) to the branch point or branch that contains the call function, the retrieved information in response to the call function may change, thus making the content associated with the branch non-deterministic. Such branching may create erroneous results or cause the crawler to loop indefinitely through the branch point and its potentially infinite number of branches. Any resulting information is inconsistent and, therefore, is not useful for search engine indexing.

Accordingly, there exists a need in the art for a method and apparatus to access rich Internet content and improve content related processes such as indexing of RIA related content.

SUMMARY

A method and apparatus for accessing rich Internet content is disclosed. In one embodiment, a computer implemented method selects an event within a rich Internet application (RIA) and determines if execution of the event requires at least one non-deterministic parameter value. If execution of the event requires at least one non-deterministic parameter value, the method sets the at least one non-deterministic parameter value to a predetermined parameter value and executes the event using the predetermined parameter value to access rich Internet content associated with the event.

While the method and apparatus for accessing rich Internet content is described herein by way of example for several embodiments and illustrative drawings, those skilled in the art will recognize that the method and apparatus for accessing rich Internet content is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for accessing rich Internet content as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for accessing rich Internet content are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. Various embodiments provide a method and apparatus for accessing rich Internet content generally associated with rich Internet applications (RIAs).

Figure 1:
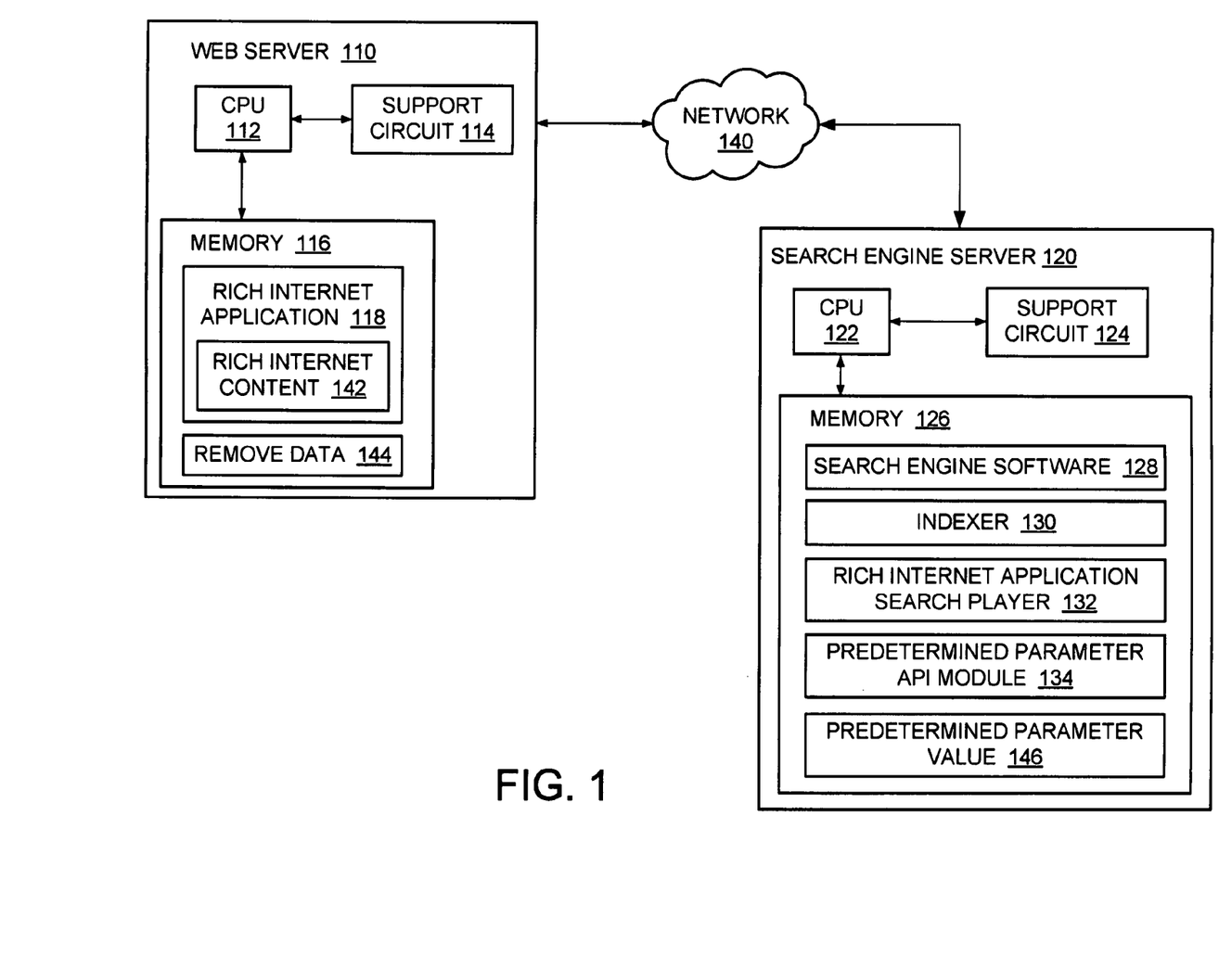
FIG. 1 is a schematic representation of a system for indexing rich Internet content according to one or more embodiments.

FIG. 1 is a system 100 for providing content related processes, specifically, indexing content associated with an RIA, utilizing embodiments of the invention for accessing rich Internet content to improve web content availability. The system 100 comprises a web server 110 and a search engine server 120. A network 140 couples the web server 110 to the search engine server 120. In different embodiments, web server 110 and the search engine server 120 may be or may include any of various types of devices, including, but not limited to, a personal computer system, desktop computer, laptop, notebook, or notebook computer, mainframe computer system, handheld computer, workstation, network computer, a consumer device, video game console, application server, storage device, a peripheral device such as a switch, modem, router, or in general any type of computing or electronic device.

In various embodiments, network 140 may include one or more networks including but not limited to Local Area Networks (LANs) (e.g., an Ethernet or corporate network), Wide Area Networks (WANs) (e.g., the Internet), wireless data networks, some other electronic data network, or some combination thereof.

The web server 110 generally includes a CPU 112, support circuits 114, and a memory 116. The details of a computing system that may perform the functions of the web server 110 are described with respect to FIG. 6 below. The memory 116 includes a rich Internet application (RIA) 118, its associated rich Internet content 142 and remote data 144 (i.e., information that is used by the RIA 118, but is called from outside the rich Internet content 142).

One example of an RIA is a SWF file that supports rich multimedia content as well as interactive functions when executed by an RIA player such as a FLASH player. In various embodiments, the support circuits 114 comprises one or more support circuits including but not limited to input/output (I/O) interface, network interface, power supplies, cache, clock circuits, one or more input/output devices such as cursor control device, keyboard, and display(s) and the like. In various embodiments, the memory 116 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within the memory 116. In other embodiments, program instructions and/or data may be received, sent or stored upon different types of computer-accessible media or on similar media separate from the memory 116 or the web server 110.

The search engine server 120 generally includes a CPU 122, support circuits 124, and a memory 126. The details of a computing system that is capable of performing the functions of the search engine server 120 are described with respect to FIG. 6 below. The memory 126 includes search engine software 128, an indexer 130, a rich Internet application (RIA) search player 132, and a deterministic parameter application programming interface (DP-API) module 134.

The search engine software 128 provides functionality for searching the Internet. The indexer 130 indexes various web pages on the Internet through organizing key words (text) from accessed pages into a rapidly searchable index. The RIA search player 132 assists the indexer 130 in indexing rich Internet content. That is accessible through RIA 118. When the search engine software 128 accesses a page containing an RIA such as RIA 118, the software 128 executes the RIA search player 132 to facilitate indexing the content 142 of the RIA 118. The rich Internet application (RIA) search player 132 excites all the events that a user might select while using an RIA player as well as excites all events that are automatically executed by an RIA player. Thereby, all potential paths of all events are traversed and the content is mined (i.e., accessed and indexed). During traversal of the potential paths, branching of paths is generally encountered. Such branching points are tagged. Once, one path (branch) is completely indexed, the completed path is retraced back to the branch point and an alternate path from the branch point. is traversed.

While traversing all potential paths of the RIA 118, some elements of the content introduce non-determinism. Such elements are events of the RIA 118 that require at least one non-deterministic parameter value (e.g., remote data 144) to be used during execution. For example, during execution, a call may be made to access information outside the RIA 118, or its associated content 142, to retrieve time, position, random values, network related information and the like (i.e., remote data 144) that are used to control aspects of the event execution as well as control the displayed content. Non-determinism traditionally does not allow a path to be retraced, thereby preventing effective indexing of the content 142. In one embodiment, when a call for a non-deterministic parameter is encountered within the RIA 118, the RIA search player 132 launches the DP-API module 134. The DP-API module 134 provides a predetermined parameter value 146 where a non-deterministic parameter value (remote data 144) is required to access the rich Internet content 142. The functionality of the RIA search player 132 and the DP-API module 134 is described in detail below with reference to method 400 and method 500 in FIG. 4 and FIG. 5, respectively. Providing a predetermined parameter value 146 where a non-deterministic parameter value is required to execute or play events in the RIA 118 enables the branch(es) to be reliably retraced and allows effecting indexing of the rich Internet content 142 associated with the RIA 118.

Figure 2:
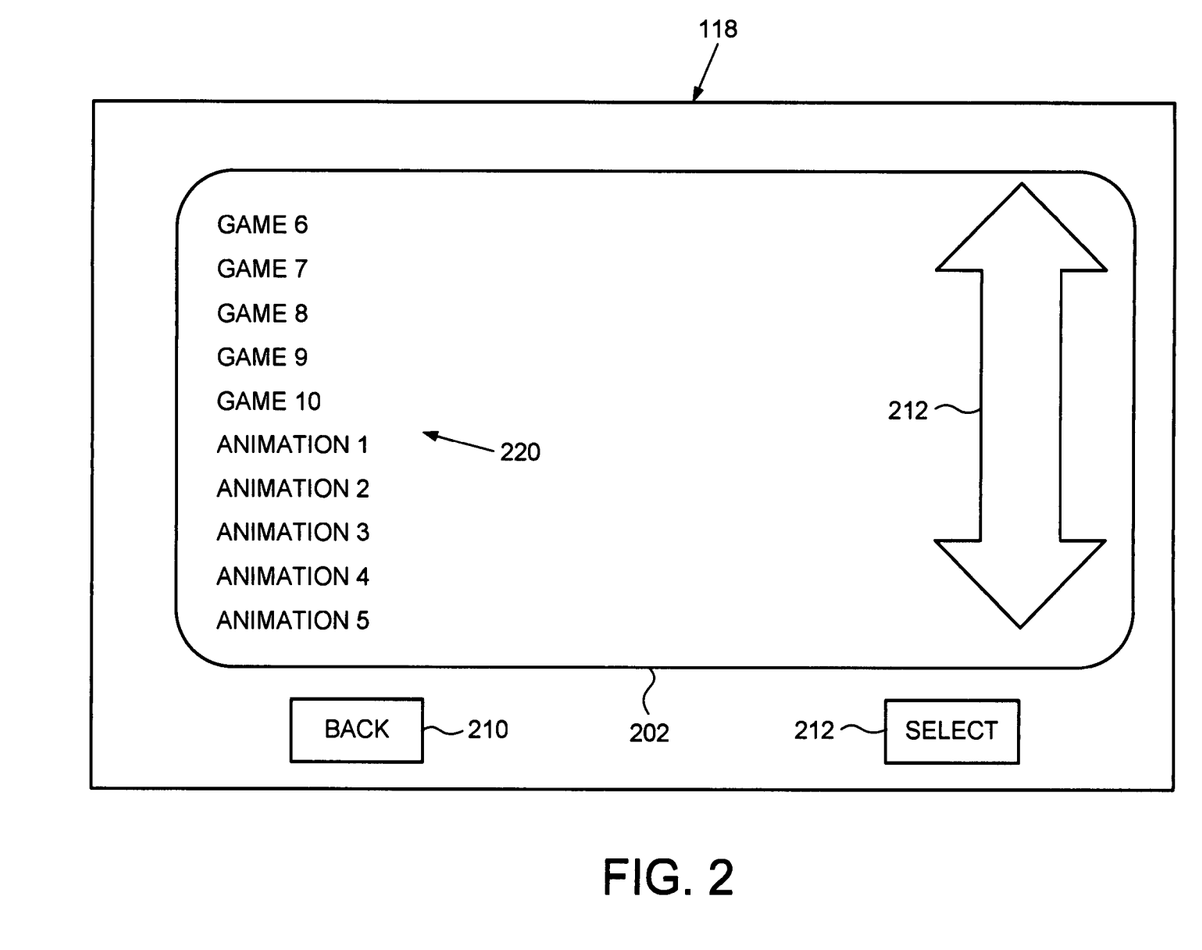
FIG. 2 is a representative screen shot showing a menu screen generated during execution of a rich Internet application (RIA).

FIG. 2 is a representative screen shot showing a menu screen 202 of an RIA according to one embodiment. In one illustrative embodiment, an RIA 118 comprises a rich Internet application in a SWF file format. The RIA 118 comprises games and animations, as well as menus to navigate the RIA 118. In use, an RIA comprises a plurality of frames that can be output in a specified order, or according to an input. For example, animations within the RIA 118 are executed in sequential order at a frame rate specified in the RIA 118. But, interactive games within the RIA 118 may display frames in an order based on the user's input, such as by selecting options within the game, and by playing the game itself. In other instances, frames may be selected for display based on remote data 144 retrieved from a location external to the RIA 118. The frames themselves may form remote data 144 that is retrieved from outside the RIA 118 and displayed as if the frame were part of the rich Internet content 142 within the RIA 118.

Because the RIA 118 has different options, there are different branches within the RIA 118 that may be selected by a user or by the RIA itself. Such an RIA 118 comprises a tree structure describing the arrangement of frames or groups of frames within the RIA 118. Inputs received by the RIA may cause the RIA to traverse down one branch of the tree or another, and to output frames associated with each traversed branch in the tree.

In addition to the content within the RIA 118, RIA 118 may comprise additional information. For example, an RIA having an animation or other frame sequence may also include a frame rate, a timing signal for communicating with the RIA player, or other signals to cause events within the RIA to occur. An RIA player may examine information, such as a frame rate, to determine how to playback the RIA content, and may interpret signals received from the RIA to indicate playback is proceeding correctly or to cause other content to be invoked.

As depicted in the RIA menu screen 202 shown in FIG. 2, the RIA 118 comprises a plurality of animations. To configure an RIA player to properly playback animation sequences, the RIA 118 comprises a plurality of frame rates for the different animations embedded within the RIA 118. The RIA also comprises a plurality of timing signals associated with the animations. In some RIAs, the timing signals within the RIA are not generated based on a frame rate, but are generated asynchronously to the execution of the RIA. For example, a timing signal may occur every 50 ms, regardless of a specified frame rate of within the RIA.

As a part of each of the animations, games, and interfaces, the RIA comprises a plurality of frames that may be generated for display. Specifically, during playback of the RIA, the RIA player may output frames from the RIA in a particular order, such as by playing the frames of an animation in sequence. Alternatively, the RIA player may generate the frames in an order specified by user input. For example, the RIA player may first display a menu frame (such as screen 202) to allow a user to select how to playback the frames within the RIA 118. The RIA player may then advance to a different frame within the RIA 118 based on the user's selection.

For example, the main menu screen 202 of the RIA 118 displays textual information in a menu 220, as well as interface elements, such as buttons 210, 212 and a scroll bar 212. The RIA 118 shown in FIG. 2 allows a user to scroll through a menu of animations and games by using the scroll bar 212. When a user desires to view one of the animations, or to play one of the games, the user may select the desired menu item, and press the 'Select' button 212. The RIA player will then access the selected content and display the animation for the user, or allow the user to play the game. During a search engine indexing process, a search engine such as, for example, the search engine software 128 of FIG. 1 using the RIA search player 132, parses the RIA 118 into searchable text by identifying all of the textual fields in the menu 220, and then selects and parses each of the available animations and games by traversing the tree structure of the RIA 118 and its content. The text found in frames of each path (branch) of the tree is indexed.

Figure 3:
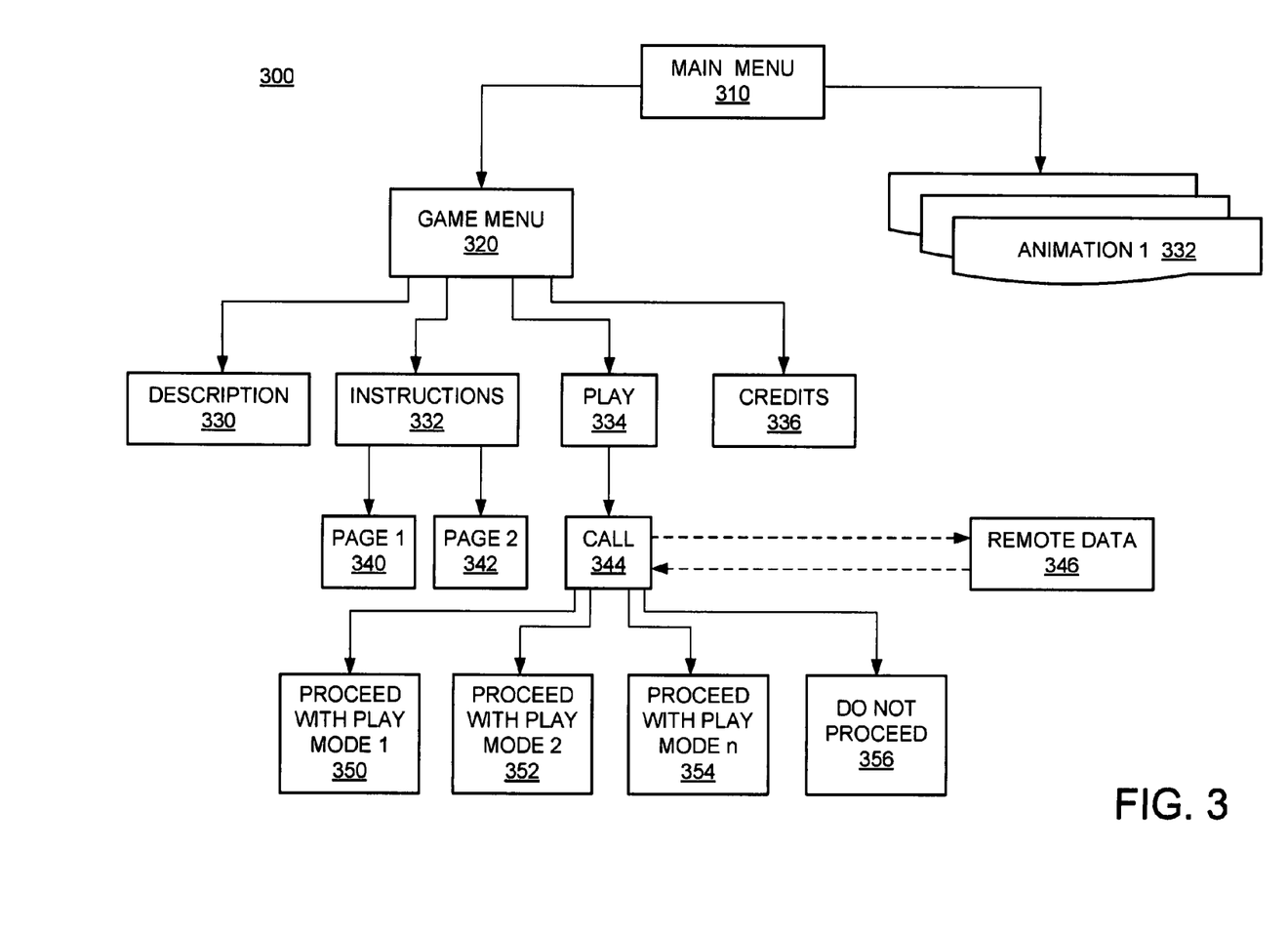
FIG. 3 is a block diagram illustrating a part of a tree structure related to the RIA of FIG. 2.

FIG. 3 is a block diagram illustrating a part of a tree structure 300 related to the RIA 118 of FIG. 2. A tree 300 includes multiple branches which connect the nodes within the tree. Each node in the tree includes a frame or frames of the rich Internet content of the RIA. For example, main menu node 310 comprises a single frame, the main menu screen, while node 322 includes all of the frames associated with Animation 1. During typical use of the RIA, when the main menu screen 202 is displayed to the user, the user may select one of the items available in the menu. In response to receiving the selection of an item, an RIA player traverses the tree 300 to the node having the selected content. However, during a search engine indexing procedure, the RIA search player 132 under control of the search engine software 128 of FIG. 1, exercises each node in the tree and enables the text of each frame associated with a node (if any) to be indexed.

For example, from the main menu screen 202, the search engine software 128 may select Game 9, which causes the RIA search player 132 to traverse the tree to the Game Menu node 320. From here, the software 128 may select each of the four menu options: a description 330 of the game, instructions 332 for the game, play 334 the game, or see the credits 336 for the game. Each of these menu options may lead to additional screens, for example, the instructions menu option 332 allows the search engine software 128 to retrieve two pages of instruction information about the game. The two pages of instruction information may for example include Page 1 340 and Page 2 342. Furthermore, each of these screens may include an animation that comprises a plurality of frames. At each frame, the search engine software 128 utilizes the indexer 130 to index the text of each frame or sequence of frames.

As the tree is traversed, the search engine software 128 selects the Play option 334, which causes the RIA search player 132 to access remote data 346 and to traverse the tree to the node labeled Call 344. Remote data 346 may include data or any other information that is required for executing the RIA. From the Call 344, the search engine software 128 is presented with another set of menu options for selecting a predetermined number of modes for playing the game at nodes 350, 352 and 354, and an option to not proceed at node 356. The search engine software 128 may select any of the modes for playing the RIA and the RIA search player 132 then plays the RIA accordingly. If the search engine software 128 selects the option of not proceeding with the game at node 356 or once the user has finished playing the game, the search engine software 128 may return to the main menu block 310, and then select Animation 322. The RIA search player 132 then plays the animation 322. In this manner, the search engine software 128 exposes information for the indexer 130 to create an index of the rich Internet content.

If the remote date 346 is non-deterministic, i.e., with each call, different data will result and a different branch will be used, the RIA search player, as described below, uses the predetermined parameter API module 134 in FIG. 1 to hold the remote data constant until the search engine completes the indexing process. Consequently, the predetermined parameter API module makes the non-deterministic outcome of the call function deterministic.

Figure 4:
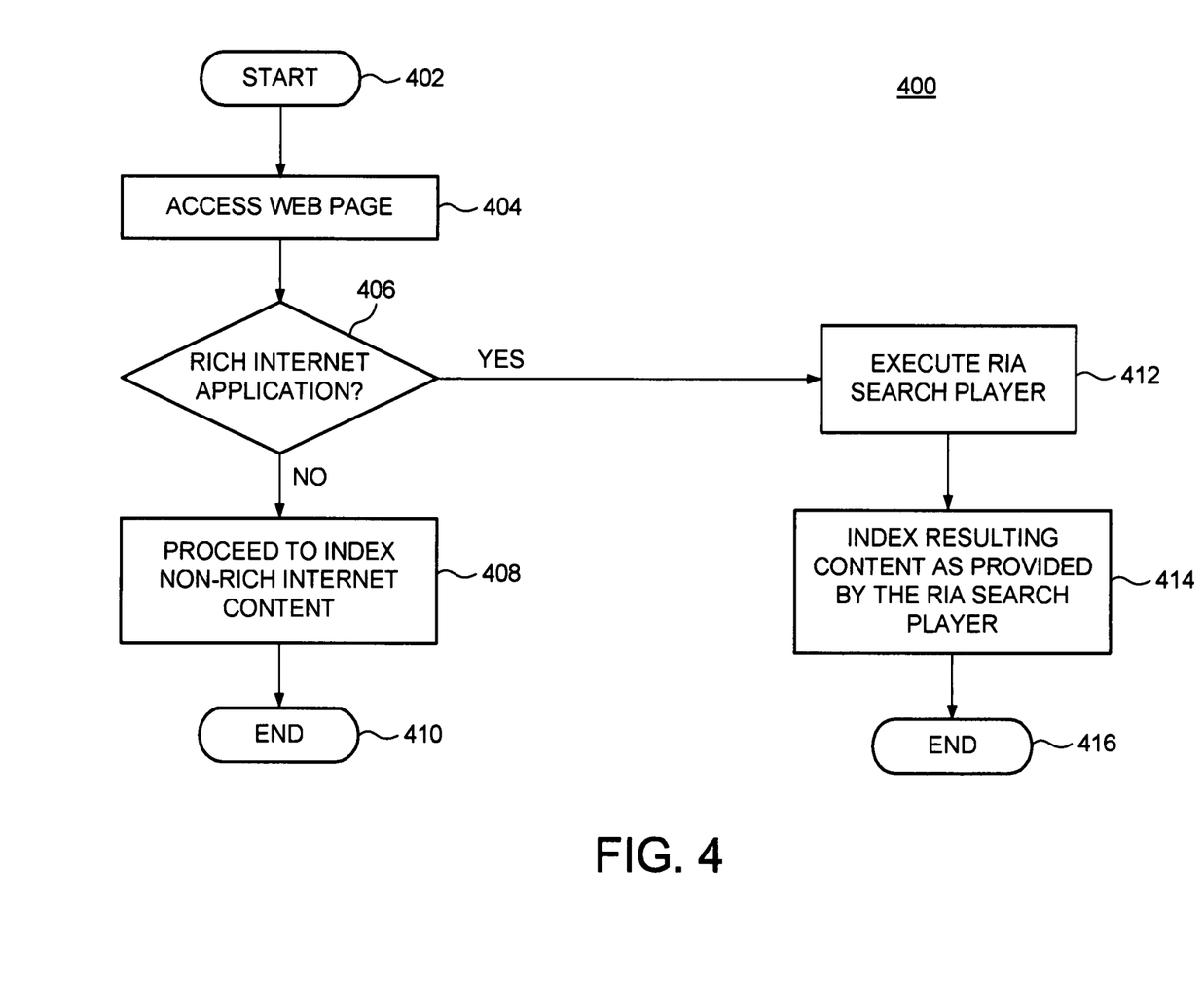
FIG. 4 is a flow diagram illustrating a method of indexing rich Internet content according to one or more embodiments.

FIG. 4 is a flow diagram illustrating a method 400 for indexing content, for example, by search engine software 128 of FIG. 1 being executed by the search engine server 120, according to an embodiment. The method 400 starts at step 402, and proceeds to step 404 at which a web page and the content therein, is accessed. At step 406, a determination is made as to whether the content includes an RIA. If the content does not include an RIA (option "NO"), the method 400 proceeds to step 408, at which non-rich Internet content is indexed, i.e., the RIA search player exposes the text from the page and the indexer organizes the text into a searchable index. The method 400 ends at step 410.

If at step 406, a determination is made that the content includes an RIA (option "YES"), the method 400 proceeds to step 412. At step 412, the RIA search player, for example, RIA search player 132 of FIG. 1, is executed. At step 414, the resulting content exposed by the RIA search player execution is indexed, i.e., the text from a frame is organized into a searchable index. One embodiment of step 414 is described in detail below with respect to FIG. 5. Once the RIA search player has completed accessing all the content of the RIA, the method 400 ends at step 418.

While executing the RIA, the RIA search player may encounter events that have associated non-deterministic parameter values. For example, the non-deterministic parameter values may include a random number, a time related function, a position function, network related data and/or the like. In one embodiment, non-deterministic parameters are identified when the event intends to access information outside the RIA and this information may change with each access. To eliminate any anomalous affects to indexing that may result from encountering non-deterministic parameters; one embodiment utilizes a procedure to hold the remote data constant while indexing.

Figure 5:
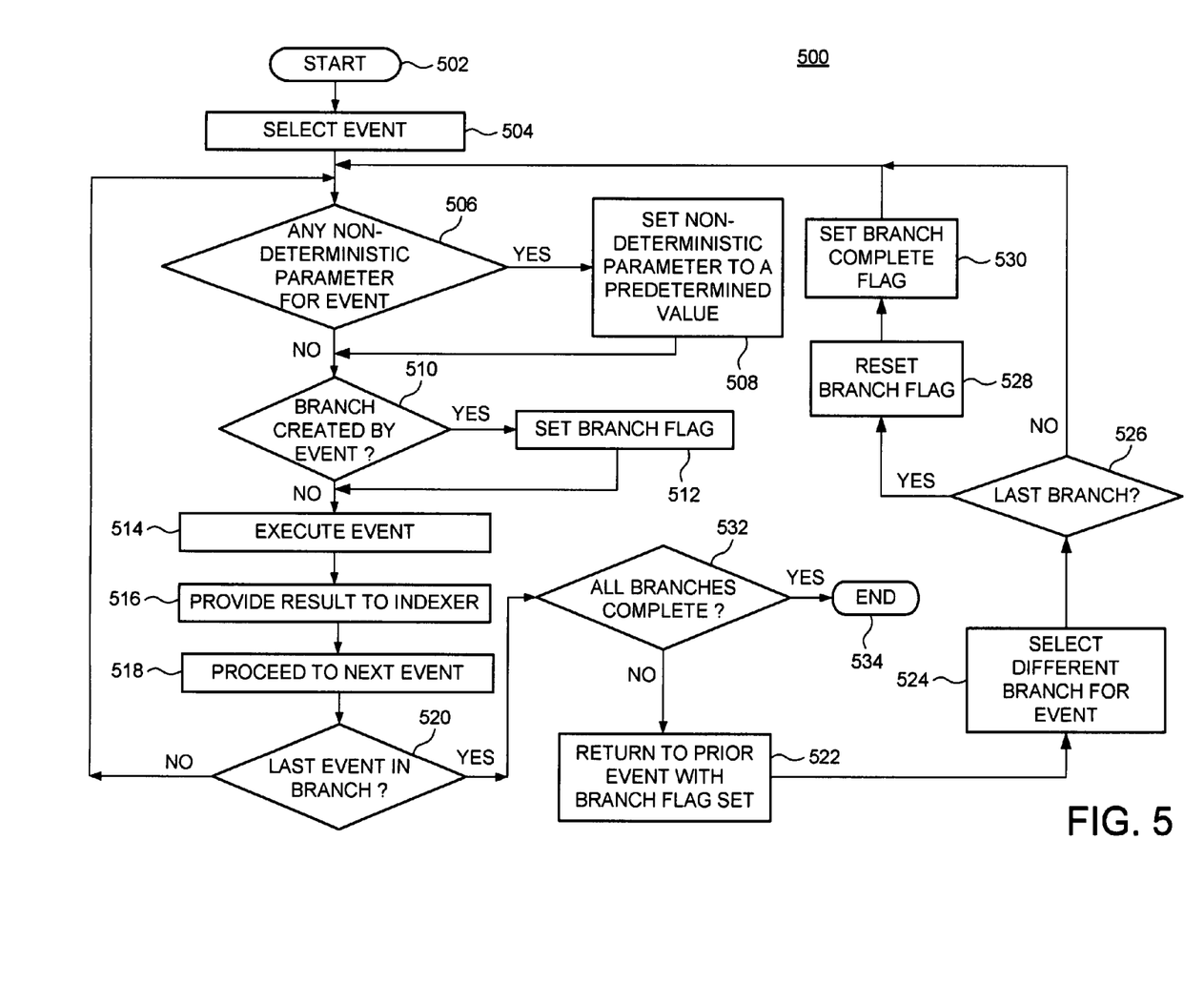
FIG. 5 is a flow diagram illustrating a method of indexing rich Internet content by a rich Internet application (RIA) search player according to one or more embodiments.

FIG. 5 is a flow diagram illustrating a method 500 for indexing of rich Internet content by an RIA search player for example, the RIA search player 132 of FIG. 1, according to an embodiment. The method 500 starts at step 502 and proceeds to step 504 at which the RIA search player selects an event within a node that typically leads to another node. At step 506, the method 500 queries whether any non-deterministic parameters are required for execution of the selected event, e.g., the method 500 identifies a call function that requires remote data. If any non-deterministic parameter values are required for execution of the selected event (option "YES"), the method 500 proceeds to step 508 at which the non-deterministic parameter is set to a predetermined value. For example, the method identifies character strings within a call function known to require remote data such as time, random number, position, location, network data and the like. The method, as discussed in the example below, provides a fixed, known parameter value to be used by the call function until the indexing procedure is complete. Once the parameter is set, the method 500 then proceeds to step 510. If at step 506, the method 500 determines that a non-deterministic parameter is not required, the method proceeds to step 510.

At the step 510, a determination is made whether a branch is created at the event. If a branch is created at the event (option "YES"), a branch flag is set at step 512 to enable the method 500 to retrace to the branch points, and the method proceeds to step 514. If a branch does not exist at the event (option "NO"), the method proceeds to the step 514. At the step 514, the event is executed. At step 516, the resulting content provided by the execution of the event is exposed to the indexer, e.g., the event results in a new frame and the indexer mines the text within the frame. At step 518, the method 500 proceeds to the next event along the branch of the RIA. At step 520, the method 500 queries whether the event executed is last in the branch. If the event executed is not the last in the branch (option "NO"), the method 500 proceeds to step 506, to traverse other nodes within the branch, which have not been traversed yet. If the event executed is the last in the branch (option "YES"), the method 500 proceeds to step 532.

At step 532, the method 500 queries whether all the branches are complete, i.e., no branch flags remain set. If the query is affirmatively answered, the method has completed the RIA indexing and ends at step 534. If the query is negatively answered, the method 500 proceeds to step 522 to continue the indexing procedure in a new branch.

At the step 522, the method 500 returns to a node having a prior event with the branch flag already set within the last branch that was traversed (i.e., retrace the branch). At step 524, a different branch for the event is selected. At step 526, the method 500 queries whether the last branch has been reached. If the last branch is not reached (option "NO"), the method 500 proceeds to the step 506, for traversing a different branch and execute event(s) associated with the different branch. If the last branch is reached (option "YES"), the branch flag is reset at step 528. At step 530, the branch complete flag is set to indicate that a branch has been completely traversed. Determinations at step 520 and step 526 ensure that all possible events of RIA are executed and resulting contents are provided for efficient indexing of the RIA Accordingly, the method 500 advantageously and effectively handles non determinism introduced due to non-deterministic parameter values, by setting a predetermined value for the non-deterministic parameter values. According to various embodiments, a DP-API module, for example, the DP-API module 134, sets a predetermined value for the non-deterministic parameter values. Further, the RIA search player uses the predetermined parameter values provided by the DP-API to execute the RIA during the indexing process.

According to an embodiment, the RIA search player 132 uses, for example, the structures of int RandomNumber, tm DateTimeParam and string locale to initialize the non-deterministic parameters. These structures are initialized when the search engine initializes the RIA search player. The same set of parameters is used during the repeated invocations of functions (i.e., during path retracing) that are non-deterministic in nature. The structures (the values they represent) are the most common parameters which introduce non-determinism, i.e., random number, locale and time. Other structures may be added and initialized to handle other non-deterministic parameters that may be utilized by an RIA or RIA player.

The parameters are used as follows:
  RandomNumber—used for accessing a random number. Some of the common use cases include making a random selection within a set of values. In one embodiment, the DP-API module sets the RandomNumber parameter value to a predefined value.

Locale—used for setting the locale of RIA execution. The value of this parameter has implications on how the currency, date strings are parsed. In one embodiment, the DP-API module sets the Locale parameter value to a fixed location.

Time—used for setting a time of RIA execution. In one embodiment, the DP-API module sets the value to simulate a value whenever a GetTime( ) kind of call is made inside the flash content. If this value is set, this same value is returned during retracing of a path.

Thus, by initializing the foregoing parameters upon execution of the RIA search player, the values used during path retracing are deterministic. As such, content related processes, such as indexing, will produce deterministic and useful results.

Example Computer System for Implementing the Web Server 110 or the Search Engine Server 120

Various embodiments of method and apparatus for accessing rich Internet content, as described herein, may be executed on one or more computer systems, which may interact with various other devices. One such computer system is computer system 600 illustrated by FIG. 6, which may in various embodiments implement any of the elements or functionality illustrated in FIGS. 1-5. In various embodiments, computer system 600 may be configured to implement the web server 110 and/or the search engine server 120 described above. In the illustrated embodiments, computer system 600 may be configured to implement the search engine software 128 and the RIA search player 132 as processor-executable executable program instructions 622 (e.g., program instructions executable by processor(s) 610 a-n) in various embodiments.

Figure 6:
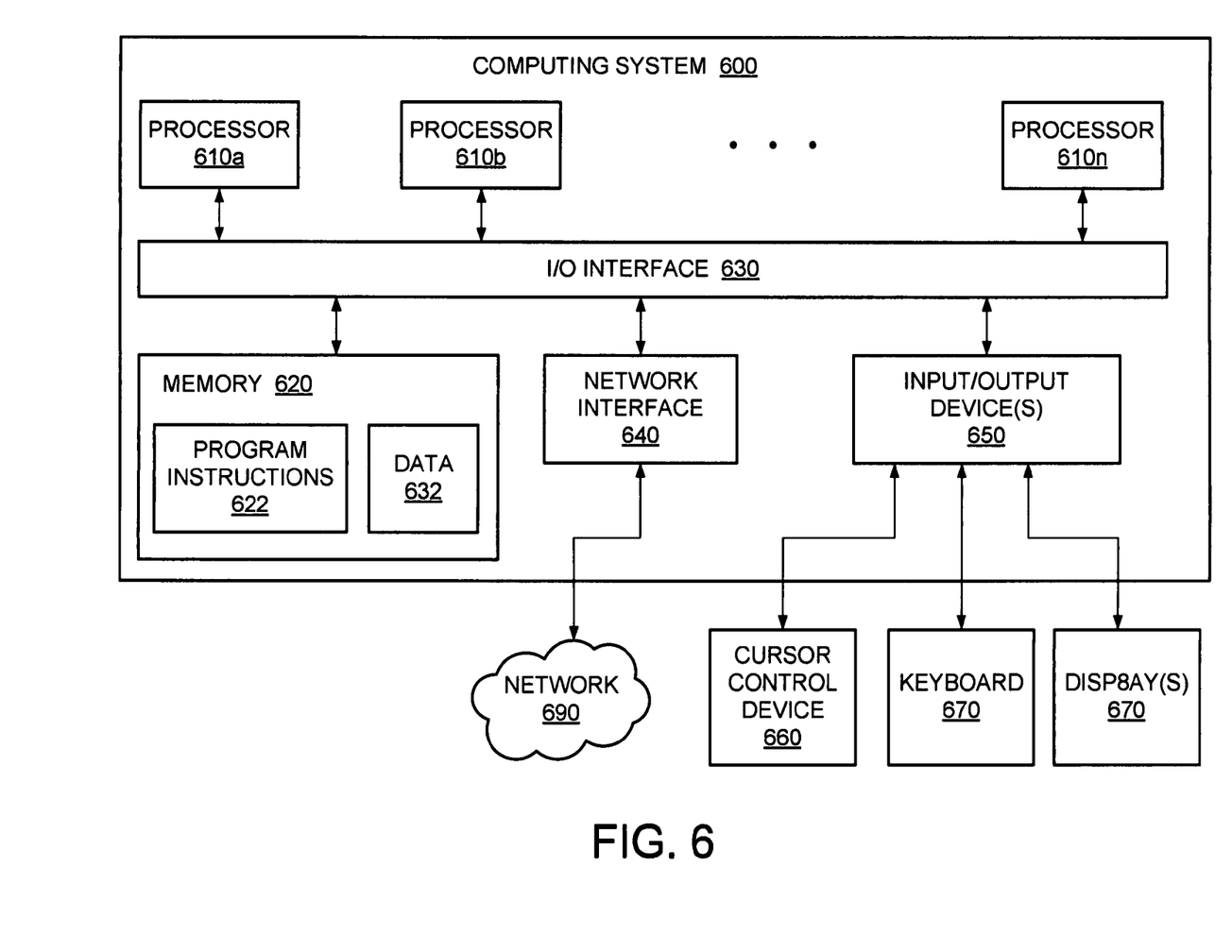
FIG. 6 is a block diagram of a computing system that can be used as a web server or search engine server according to one or more embodiments.

In the illustrated embodiment, computer system 600 includes one or more processors 610a-n coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In various embodiments, any of components 660, 670 may be utilized by the software to receive user input. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, a personal computer system, desktop computer, laptop, notebook, or netbook computer, mainframe computer system, handheld computer, workstation, network computer, a consumer device, application server, storage device, a peripheral device such as a switch, modem, router, or in general any type of computing or electronic device.

In various embodiments, computer system 600 may be a uniprocessor system including one processor 610, or a multiprocessor system including several processors 610a-610n (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x96, PowerPC, SPARC, or MIPS ISAs, or any other suitable ISA. In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650, In some embodiments, I/O interface 630 may perform any necessary protocol, timing or other data transformations to convert data signals from one components (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620 may be incorporated directly into processor 610.

Network interface 640 may be configured to allow data to be exchanged between computer system 600 and other devices attached to a network (e.g., network 690), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated by the flowcharts of FIGS. 4 and 5. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to various embodiments of the invention, other and further embodiments may be devised without departing from the basic scope thereof, and the scope thereof is determined by the claims that follow.

The invention claimed is:

1. A computer implemented method for accessing rich Internet content (RIC) comprising:
   selecting an event in a plurality of events within a rich Internet application (RIA), wherein the plurality of events are organized as a tree, and wherein a branch of the tree in a plurality of branches of the tree comprises one or more events;
   determining if execution of the event requires at least one non-deterministic parameter value;
   if execution of the event requires at least one non-deterministic parameter value,
   setting the at least one non-deterministic parameter value to a predetermined parameter value;
   executing the event using the predetermined parameter value; and
   flagging a branch as complete when all events on the branch are executed, such that no event on the branch is selected for execution again;
   wherein the RIA comprises the RIC and executable software code enabling an RIA player to access the RIC;
   wherein the event comprises a call function that requests a value for the non-deterministic parameter.

2. The method of claim 1 wherein executing the event accesses the rich Internet content enabling an indexer of web information to index the RIC.

3. The method of claim 1, wherein the at least one non-deterministic parameter value is at least one of a random number, a time related value, network information, position information or a location information.

4. The method of claim 1 wherein the RIA is a SWF file.

5. The method of claim 1, wherein the at least one non-deterministic parameter comprises a value accessed outside of the RIA containing the RIC and the event.

6. The method of claim 1 wherein the RIA comprises a plurality of events that are organized as a tree, wherein at least one event requires a non-deterministic parameter value and the non-deterministic parameter value is set to the deterministic parameter value while rich Internet content associated with each event in the plurality of events in the tree are being indexed.

7. A non-transitory computer readable medium for storing software that, when executed by a computing system, causes the computing system to perform a method for accessing rich Internet content (RIC):
   selecting an event in a plurality of events within a rich Internet application (RIA), wherein the plurality of events are organized as a tree, and wherein a branch of the tree in a plurality of branches of the tree comprises one or more events;
   determining if execution of the event requires at least one non-deterministic parameter value;
   if execution of the event requires at least one non-deterministic parameter value, setting the at least one non-deterministic parameter value to a predetermined parameter value; and
   executing the event using the predetermined parameter value; and
   flagging a branch as complete when all events on the branch are executed, such that no event on the branch is selected for execution again;

wherein the RIA comprises the RIC and executable software code enabling an RIA player to access the RIC;
wherein the event comprises a call function that requests a value for the non-deterministic parameter.

8. The computer readable medium of claim 7 wherein executing the event accesses the rich Internet content enabling an indexer of web information to index the RIC.

9. The computer readable medium of claim 7, wherein the at least one non-deterministic parameter value is at least one of a random number, a time related value, network information, position information or a location information.

10. The computer readable medium of claim 7 wherein the RIA is a SWF file.

11. The computer readable medium of claim 7 wherein the at least one non-deterministic parameter comprises a value accessed outside of the RIA containing the RIC and the event.

12. The computer readable medium of claim 7 wherein the RIA comprises a plurality of events that are organized as a tree, wherein at least one event requires a non-deterministic parameter value and the non-deterministic parameter value is set to the deterministic parameter value while rich Internet content associated with each event in the plurality of events in the tree are being indexed.

13. Apparatus for accessing rich Internet content (RIC) comprising:
 a computer having one or more processors and further comprising:
 a rich Internet application (RIA) search player executed by the processor for executing at least one event in a plurality of events within the RIA, wherein the plurality of events are organized as a tree, and wherein a branch of the tree in a plurality of branches of the tree comprises one or more events, and wherein execution of the at least one event requires at least one non-deterministic parameter value;
 a deterministic parameter application programming interface module executed by a processor for setting the at least one non-deterministic parameter value to a predetermined parameter value to enable rich Internet content within the RIA to be indexed and flagging a branch as complete when all events on the branch are executed, such that no event on the branch is selected for execution again; and
a computer memory for storing a generated searchable index;
 wherein the RIA comprises the RIC and executable software code enabling an RIA player to access the RIC;
 wherein the event comprises a call function that requests a value for the non-deterministic parameter.

14. The apparatus of claim 13 further comprising:
an indexer for indexing the rich Internet content using the predetermined parameter value.

15. The apparatus of claim 13 further comprising:
a search engine for controlling the rich Internet content search player to access rich Internet content within the RIA.

16. The apparatus of claim 13 wherein the RIA comprises a plurality of events that are organized as a tree, wherein at least one event requires a non-deterministic parameter value and the non-deterministic parameter value is set to the deterministic parameter value while rich Internet content associated with each event in the plurality of events in the tree are being indexed.

* * * * *